United States Patent
Boreave (10) Patent No.: US 7,182,852 B2
(45) Date of Patent: Feb. 27, 2007

(54) CRYOGENIC TANK TESTING METHOD INCLUDING CATHODIC PROTECTION

(75) Inventor: Alphonse Boreave, Hanches (FR)

(73) Assignee: Saipem S.A., Montigny le Bretonneux (FR)

( * ) Notice: Subject to any disclaimer, the term of this patent is extended or adjusted under 35 U.S.C. 154(b) by 545 days.

(21) Appl. No.: 10/477,361

(22) PCT Filed: Oct. 10, 2003

(86) PCT No.: PCT/FR03/03007

§ 371 (c)(1),
(2), (4) Date: Nov. 12, 2003

(87) PCT Pub. No.: WO2004/081543

PCT Pub. Date: Sep. 23, 2004

(65) Prior Publication Data

US 2004/0238377 A1   Dec. 2, 2004

(30) Foreign Application Priority Data

Feb. 14, 2003   (FR) .................................. 03 01813

(51) Int. Cl.
*G01N 27/26* (2006.01)
(52) U.S. Cl. .................. 205/776; 205/777; 205/725; 205/730; 205/731; 205/735; 205/736; 205/740
(58) Field of Classification Search ................ 205/776, 205/777, 725, 730, 731, 735, 736, 740
See application file for complete search history.

(56) References Cited

U.S. PATENT DOCUMENTS

| 2,941,935 | A |   | 6/1960 | Millet et al. |
|---|---|---|---|---|
| 3,479,256 | A |   | 11/1969 | Smith et al. |
| 3,855,102 | A | * | 12/1974 | Palmer .................. 204/196.34 |
| 4,796,676 | A |   | 1/1989 | Hendershot et al. |
| 4,798,657 | A | * | 1/1989 | Kochilla et al. ............. 205/738 |
| 4,936,969 | A |   | 6/1990 | Garlinger |
| 4,971,663 | A |   | 11/1990 | Sadoway et al. |
| 5,643,424 | A |   | 7/1997 | Riffe et al. |
| 6,132,593 | A |   | 10/2000 | Tan |
| 6,511,586 | B1 |   | 1/2003 | Nakashima et al. |
| 6,540,886 | B1 | * | 4/2003 | Russell .................. 204/196.01 |
| 6,809,506 | B2 | * | 10/2004 | Thomas et al. ............. 324/71.1 |

FOREIGN PATENT DOCUMENTS

| EP | 0 258 170 A2 | 8/1996 |
|---|---|---|
| FR | 1.082.119 | 12/1954 |
| JP | 08 142 978 | 6/1996 |

* cited by examiner

*Primary Examiner*—Bruce F. Bell
(74) *Attorney, Agent, or Firm*—Cohen, Pontani, Lieberman & Pavane LLC (57) ABSTRACT

The present invention provides a method of testing a cryogenic metal tank before it is put into service, in which said method said tank (1) is filled with water and appropriate measurements are performed where necessary, the method being characterized in that the following steps are performed:
  filling said metal cryogenic tank (1) with sea water; and
  providing the bottom and side metal walls (2, 3) of said tank (1) that are constituted essentially by bare steel, with temporary cathodic protection by injecting an electric current into anodes disposed within said tank (1) once said anodes become immersed.

Advantageously, a first anode array ($5_1$) is placed in the immediate vicinity of the bottom of the tank using support means ($5_2$), said support means ($5_2$) and said first anode(s) ($5_1$) preferably being removable. Said first anodes ($5_1$) are preferably disposed around a circle ($C_1$) concentric about the center of the surface of the bottom of the tank, and preferably the diameter of said circle ($C_1$) is 40% to 75% the diameter of the bottom surface (2) of the tank.

14 Claims, 8 Drawing Sheets

CRYOGENIC TANK TESTING METHOD INCLUDING CATHODIC PROTECTION

PRIORITY CLAIM

This is a U.S. national stage of application No. PCT/FR03/03007, filed on 10 Oct. 2003. Priority is claimed on that application and on the following application: Country: France, Application No.: 03/01813, Filed: 14 Feb. 2003.

The present invention relates to cryogenic storage tanks for liquefied gases.

More particularly, the present invention relates to a method of testing a cryogenic tank for leaks and mechanical strength before being put into service. Still more particularly, the present invention relates to a method of providing a metal cryogenic tank with cathodic protection.

Cryogenic tanks for liquefied gases are generally tested for strength and leaks prior to being put into service by being filled with fresh water. The tank is preferably filled so that the pressure inside the tank is greater than the normal pressure so as to show up more clearly any leaks that might be present.

Simultaneously, filling with water in this way serves to test the mechanical strength of the portion of the tank which is subjected to the highest levels of stress, i.e. the bottom portion of the tank, since the greater density of water compared with liquid gas (d=0.48 for liquid methane at −170° C.), then makes it possible to apply forces that are twice as great as the maximum forces in the tank in operation when filled with liquefied gas. Furthermore, for tanks on land, this test serves simultaneously to test the mechanical strength of foundations on which the tank stands since they are then subjected to a load which is twice that to which they will be subjected in normal operation.

Cryogenic tanks are made out of special steels, in particular the steel known as "9% nickel steel" which corresponds to the standard ASTM A-353 or A-353-Type 1, and which corresponds to the following chemical composition:

| | |
|---|---|
| carbon (max): | 0.13%; |
| manganese (max): | 0.90%; |
| phosphorous (max): | 0.035%: |
| sulfur (max): | 0.035%; |
| silicon: | 0.15% to 0.40%; |
| nickel: | 8.50% to 9.50%; and |
| the balance being constituted by iron. | |

This type of steel is used in cryogenic tanks because it presents properties that are advantageous for cryogenic applications, in particular good mechanical strength and good toughness at cryogenic temperatures. Nevertheless, it suffers from being highly sensitive to corrosion in the presence of water, in particular when the pH of the water is not completely neutral, as naturally applies when the water is sea water.

The resulting corrosion phenomena are generally localized and made worse in transition zones, i.e. at welds, or in material defects that can occur during the casting of the raw material and the rolling of the sheets or the bars constituting said wall of said metal tank. It is therefore essential to guarantee absolute integrity for the entire metal tank which is to confine a cryogenic gas by performing this water test.

In order to perform mechanical strength and leak testing by filling a cryogenic tank with water, it is common practice to fill the tank with fresh water, possibly having passivating chemical additives included therein for the purpose of limiting corrosion. It is preferred to keep the metal bare since applying anticorrosion paint solely for the water-fill test would constitute an unacceptable cost.

Filling the tank with water makes it possible to test it for leaks by observing the wall of the tank from the outside, particularly its vertical side wall and the location where the vertical side wall meets the bottom wall of the tank. Filling the tank with water in this way also makes it possible to test the strength of the foundation on which the tank is placed by measuring the overall or localized settling of the structure under a load that corresponds to substantially twice the load it will need to withstand under normal filling with liquid gas. Finally, this water-filling test serves to relieve strain due to welding, particularly for the welds situated in the zone where the vertical wall joins the bottom wall of the tank, with this happening merely under the effect of the pressurization due to the water pressure that exists at the bottom of the tank, which pressure is about 5 bars when the tank has a height of 50 meters (m), followed by the relaxation due to the tank being emptied of water.

The time required to perform mechanical strength and leak testing by filling the tank with water is long, essentially due to the time required for filling said tank and performing the various measurements and verifications, i.e. in practice a length of time that can exceed eight weeks, which is sufficient time to give rise to problems of corrosion when using a steel that is particularly sensitive.

Furthermore, the use of fresh water presently constitutes a major problem economically speaking and ecologically speaking since the availability of fresh water is generally poor, whereas the quantities that correspond to the volumes of cryogenic tanks in use can be as great as 150,000 cubic meters ($m^3$) or even 250,000 $m^3$. In addition, the cost of such a volume of water then constitutes a very significant fraction of the overall cost of the tank once completed. Finally, fresh water can be taken only at a limited rate per hour in order to avoid significantly disturbing the water supply mains, which has the consequence of leading to filling times that are long, thereby further increasing the risk of corrosion, not to mention the extra time needed to make the installation available. In this respect, it should also be added that it can be necessary to add corrosion inhibitors if chlorine is present, or passivating agents in order to correct a pH that is too aggressive. Under such circumstances, in addition to the additional cost due to adding the additives, environmental regulations put restrictions on the manner in which the water can be discharged into the natural surroundings while emptying the tank at the end of the test, in particular discharge into said natural surroundings must take place at a rate they are capable of absorbing. That is why it can be necessary to empty a tank slowly at the end of testing, thereby further lengthening the time before such installations can be made available.

A first object of the present invention is thus to provide a new method of performing mechanical strength and leak testing on cryogenic metal tanks prior to putting them into service, which method does not present the above-mentioned drawbacks, and in particular is less expensive and more effective in avoiding corrosion of said metal tank.

According to an original characteristic of the present invention, such methods of testing cryogenic metal tanks are performed using sea water.

Because liquefied gas storage terminals are generally situated in port areas, making direct use of sea water presents the advantage of free availability. In addition, it is very simple to organize a takeup point for extracting the desired quantity of water at high hourly rates, whereas when taking fresh water from a supply network or straight from a river there is generally a considerable limit on the rate at which it can be extracted in order to avoid disturbing the environment or the network to an unacceptable extent. Filling can be performed ten to twenty times faster using sea water, thereby obtaining a corresponding reduction in the time the tank contains water, and consequently shortening the time before the tank is made available, since the duration of testing is reduced correspondingly.

In the presence of sea water, intense corrosion takes place immediately and is concentrated particularly in the zone of the tank which has been thermally affected by the welds made between the steel plates, and still more particularly by the molds in the bottom portion of the tank as mentioned above. However, the present invention makes it possible to test cryogenic tanks by advantageously using sea water instead of fresh water, while nevertheless guaranteeing the integrity of all the metal walls of the tank both over its bottom and up the vertical side walls of the tank, and in spite of the highly corrosive effect of sea water.

Another object of the present invention is thus to provide a method of providing high levels of anticorrosion protection for a cryogenic metal tank while it is being subjected to a water-fill test prior to being put into service, and preferably for this to be achieved while not using any protective paint, i.e. while retaining bare metal.

U.S. Pat. No. 3,855,102 discloses principles for long-duration cathodic protection against corrosion in metal tanks containing fresh water by using anodes connected in strings and suspended vertically inside said tank inside the volume of water it contains, with electric current being injected into the anodes.

Such cathodic protection provides protection against the corrosion that results from contact between the metal walls and water, which protection is in addition to the protection provided by paint type anticorrosion coatings. The principle of cathodic protection lies in artificially reducing the natural electrochemical potential (E) of the metal to be protected, so as to cause the surrounding aqueous medium which has oxidizing power to be saturated with electrons, thus avoiding any dissolution of the metal, said saturation with electrons being performed by means of metal anodes immersed in said aqueous medium, which constitutes an electrolyte of given pH, and by injecting direct current (DC) into said anodes.

It is common practice to consider the so-called Pourbaix diagram which gives the electrochemical potential values at which the metal concerned has immunity as a function of pH and of electrolyte type, i.e. the electrochemical potential below which the metal is cathodically protected, i.e. at which it is properly polarized.

This polarization does not occur instantaneously, but builds up slowly and progressively around the anode, prior to reaching the desired value over the entire surface over which said anode acts. In the cathodic protection systems that are commonly implemented, it generally takes several weeks or even several months of polarizing the metal surface to be protected before polarization becomes completely effective. In the cathodic protection systems that are commonly implemented, it is desired to restrict the consumption of electricity to a reasonable value, since this current needs to be maintained permanently throughout the entire lifetime of the structure.

In practice, cathodic protection is provided in addition to anticorrosion coatings which provide effective protection, by providing an installation comprising anodes and a current feed capable of generating a current density of about 50 milliamps per square meter ($mA/m^2$), which is a current density that is sufficient to provide cathodic protection that is effective over time in any zones in which the anticorrosion coating might be damaged, which zones are generally estimated as constituting 10% or 20% of the total painted area in contact with the water.

U.S. Pat. No. 4,936,969 discloses a cathodic protection system which consists in maintaining a cable in suspension at half height within a tank of fresh water, which cable acts as an anode for continuously injecting an imposed current, the cable being suspended from floats via lines. That anode device in the form of a cable presents low current-injection capacity, but it is sufficient for protecting such a fresh water tank over a very long duration. In contrast, the initial polarization process is very slow and does not enable effective cathodic protection to be provided suitable for preventing any initiation of corrosion in a water-fill test performed on a cryogenic tank made of a bare steel that is highly sensitive to corrosion.

The current to be injected is proportional to the area to be protected, and present practice generally limits injection to a value of 80 $mA/m^2$ for ordinary non-alloy steels, which is sufficient for providing cathodic protection that is effective over time, and which also serves to limit electricity consumption to a value that is reasonable since, given that this current must be maintained permanently throughout the lifetime of the structure.

More precisely, the present invention provides a method of testing a cryogenic metal tank prior to putting it into service, in which said tank is filled with water, the method being characterized in that the following steps are performed:

filling said metal cryogenic tank with sea water; and providing temporary cathodic protection for the metal bottom and side walls of said tank that are constituted essentially by bare steel, by disposing anodes within said tank and by injecting an electric current into the anodes once they become immersed.

While the tank is being filled, a large wall area of the tank is initially wetted quickly, i.e. the bottom wall of the tank is wetted and the periphery of the bottom wall also constitutes one of the most fragile zones. In the present invention, in order for anticorrosion protection to be effective as soon as possible after filling has begun, so as to avoid any corrosion being initiated, a first anode array is placed in the immediate vicinity of the bottom of the tank using support means, with said support means and said first anode(s) preferably being removable.

This positioning of the anodes close to the bottom of the tank enables said anodes to become immersed, and thus capable of entering into action, as quickly as possible. It will thus be understood that said support means must enable said first anodes to be held close to the bottom of the tank, while nevertheless keeping them far enough away from the bottom to prevent any electrical contact between said anodes and said bottom.

The term "removable" is used herein to mean that said first anodes and said support means can be taken out of said tank after the test has completed.

More particularly, said first anodes close to the bottom of the tank are situated above the bottom of the tank at a distance of less than 50 centimeters (cm), and preferably at a distance lying in the range 2.5 cm to 20 cm, and more preferably in the range 5 cm to 10 cm. This optimum distance serves not only to avoid electrical contact between said anodes and the metal bottom of the tank, but also to avoid any electrolytic short-circuit that could be caused by the anode being too close. Thus, because the anode is close to the bottom of the tank, maximum efficiency is maintained while avoiding any risk of an electrolytic short-circuit.

In the present invention, in order to obtain optimum cathodic protection for the bottom of the tank, said first anodes are disposed around a circle concentric about the center of the bottom surface of the tank, and preferably having a diameter lying in the range 40% to 75% of the diameter of the bottom surface of the tank.

This circular disposition of said first anode(s) resting on the bottom of the tank represents a disposition that is optimal for avoiding interference between the anodes or the different portions of a single anode that might otherwise have a harmful effect on the current density actually emitted.

Said anodes may be disposed in such a manner as to form a plurality of concentric circles when the tank has a bottom of large area. Nevertheless, in practice, for tanks having a diameter of up to 75 m to 90 m, and with anodes having a capacity of 50 amps (A), a disposition comprising a single circle of diameter lying in the range 40% to 75% of the diameter of the tank suffices.

Said first anodes may be constituted by:
  one or more flexible metal cable anodes, also referred to as "wire anodes", said anode preferably forming a circle, or said different first anodes constituting portions of the circle and being disposed around the same circle; and/or
  a plurality of rigid anodes disposed discontinuously side by side and optionally interconnected by a conductive cable.

Nevertheless, in order to deliver higher current density, it is preferable to implement said first anodes in the form of a plurality of rigid anodes each being constituted in particular in the form of a block that is cylindrical, oblong, or disk-shaped.

More particularly, said first anodes are interconnected by one or more cables to form one or more first strings, said first strings being disposed substantially horizontally above and close to said bottom of the tank.

The term "string of anodes" is used to mean that said rigid anodes are connected to one another by a cable comprising a conductive wire along which said first anodes are disposed, preferably at regular distances apart, said wire being electrically insulated between two successive anodes, and electrical contact being established between the wire and said anodes.

Said first anodes are as close as possible to one another, particularly within any one string, but they are nevertheless spaced apart sufficiently to avoid electrical interference of the kind that can have a harmful effect on their effectiveness, i.e. on the current density they emit.

In an embodiment, said support means are constituted by elements made of electrically-insulating material and resting on the bottom of the tank, said elements being disposed at opposite ends of each said first anodes, where appropriate, along a said first string.

Still more particularly, said support means are constituted by disks standing vertically on the bottom of the tank, said disks having portions of insulating cable interconnecting two successive ones of said first anodes of a said first string passing through their centers, where appropriate, the diameter of said disks being greater than the dimension of said first anodes in said vertical direction.

To provide further cathodic protection to the vertical side wall of the tank after the bottom of the tank has been wetted, it is advantageous to place said first anodes in a horizontal disposition inside the tank close to its bottom, and also to place second anodes that are suspended vertically inside the tank from its top, preferably in removable manner, with said second anodes also preferably being connected together in the form of second strings that are suspended vertically, said second strings also preferably being regularly spaced apart from one another in such a manner as to be inscribed also preferably in a circular cylinder having the same axis as said tank.

In an advantageous embodiment, the end ones of said second anodes disposed at the bottom ends of said vertically-suspended second strings are situated at a height H from the bottom, such that the area $S_1$ of the circular surface bounded by said circle of first anodes is substantially equal to the area $S_2$ of the remainder of said bottom of the tank plus the area $S_3$ of the bottom portion of height H of the bottom side wall of said tank. The area $S_2$ is the remaining area of the bottom of the tank that is situated outside the area $S_1$, and $S_1 = S_2 + S_3$.

It will be understood that said first anodes present a current capacity and are provided in numbers and dispositions such as to enable them to generate a current density that enables the appropriate electrochemical potential to be achieved for avoiding the appearance of corrosion, and this in a length of time that is shorter than the time needed for corrosion to be initiated, and in particular in a length of time that is shorter than one hour, and preferably shorter than 20 minutes, and that is preferably practically instantaneous, with this happening at all points of the surface of the bottom of the tank ($S_1 + S_2$), and where appropriate at all points on the surface of the bottom portion of height H of the vertical side wall of the tank ($S_3$). This disposition of said first anodes lying close to the bottom of the tank makes it possible to provide full cathodic protection for the low portion of the tank (i.e. $S_1 + S_2 + S_3$) before the vertically-suspended second anodes for providing protection to the side walls become immersed can enter into action.

Measurements performed in accordance with the present invention on 9% nickel steel in the presence of sea water have shown that a protective electrochemical potential of −950 millivolts (mV) relative to a reference electrode of the Ag/AgCl type suffices to provide immunity.

More particularly, said tank metal is 9% nickel steel and the protective electrochemical potential of said steel is −950 mV, and said first anodes rest close to the bottom of the tank in such a manner as to enable a current density of 200 $mA/m^2$ to 400 $mA/m^2$ to be achieved. This current density is thus four to eight times greater than the current density values commonly implemented in the field of providing cathodic protection for conventional metal tanks containing water, where polarization needs to be maintained throughout the lifetime of the structure.

Strings of anodes disposed end to end around a circular geometrical figure on the bottom of the tank enable currents to be injected at a density of about 200 $mA/m^2$ to 400 $mA/m^2$.

In the present invention, by using high-capacity anodes, and in particular anodes that can accommodate very high injection currents of 50 A and capable of delivering current densities of 200 $mA/m^2$ to 400 $mA/m^2$, and by disposing the anodes at very high density, associated with small spacing lying in the range 25 millimeters (mm) to 500 mm between anodes close to the metal bottom and the wall of the tank, it is possible to reach the immunity electrochemical potential of −950 mV and to activate the polarization process over the entire bottom of the tank made of 9% nickel steel very quickly, or even practically instantaneously, as soon as said anodes are put into operation after they have become immersed in water.

The present invention thus makes it possible to perform a water test by advantageously making use of sea water instead of the fresh water that is traditionally used, while nevertheless guaranteeing the integrity of the entire confinement envelope, both over the bottom and up the vertical sides of the tank.

According to another advantageous characteristic of the present invention, said tank is initially filled with fresh water until said first anodes lying in the immediate vicinity of the bottom of the tank have been completely immersed, after which electric current is injected into said first anodes and the filling of said tank is continued, but using sea water.

Given the closeness of said first anodes to the bottom of the tank, the initial filling with fresh water represents a small volume of water and serves to reduce even further any risk of corrosion prior to said first anodes being able to enter into action and provide effective cathodic protection to the bottom of the tank.

Advantageously, according to another characteristic of the present invention, devices are placed on the bottom and against the walls of said tanks in order to measure the electrochemical potential of said wall and control a plurality of electricity generators or controllers capable of feeding electric current differently to said first and second anodes so as to be able to regulate the quantity of electric current that is injected into the various anodes as a function of said measurements performed in association with the various anodes, depending on their positions.

The present invention also provides a cryogenic tank having bare metal walls of steel, suitable for use in a test method of the invention, the tank being characterized in that it includes a temporary cathodic protection system comprising anodes as defined above, said anodes preferably being disposed removably within said tank, and in that it also preferably includes devices enabling the electrochemical potential of said walls to be measured so as to control a plurality of electricity generators or controllers suitable for feeding differing amounts of electric current to said anodes as defined above.

Other characteristics and advantages of the present invention appear in the light of the following detailed description of various embodiments, given with reference to the following figures.

Figure 1:
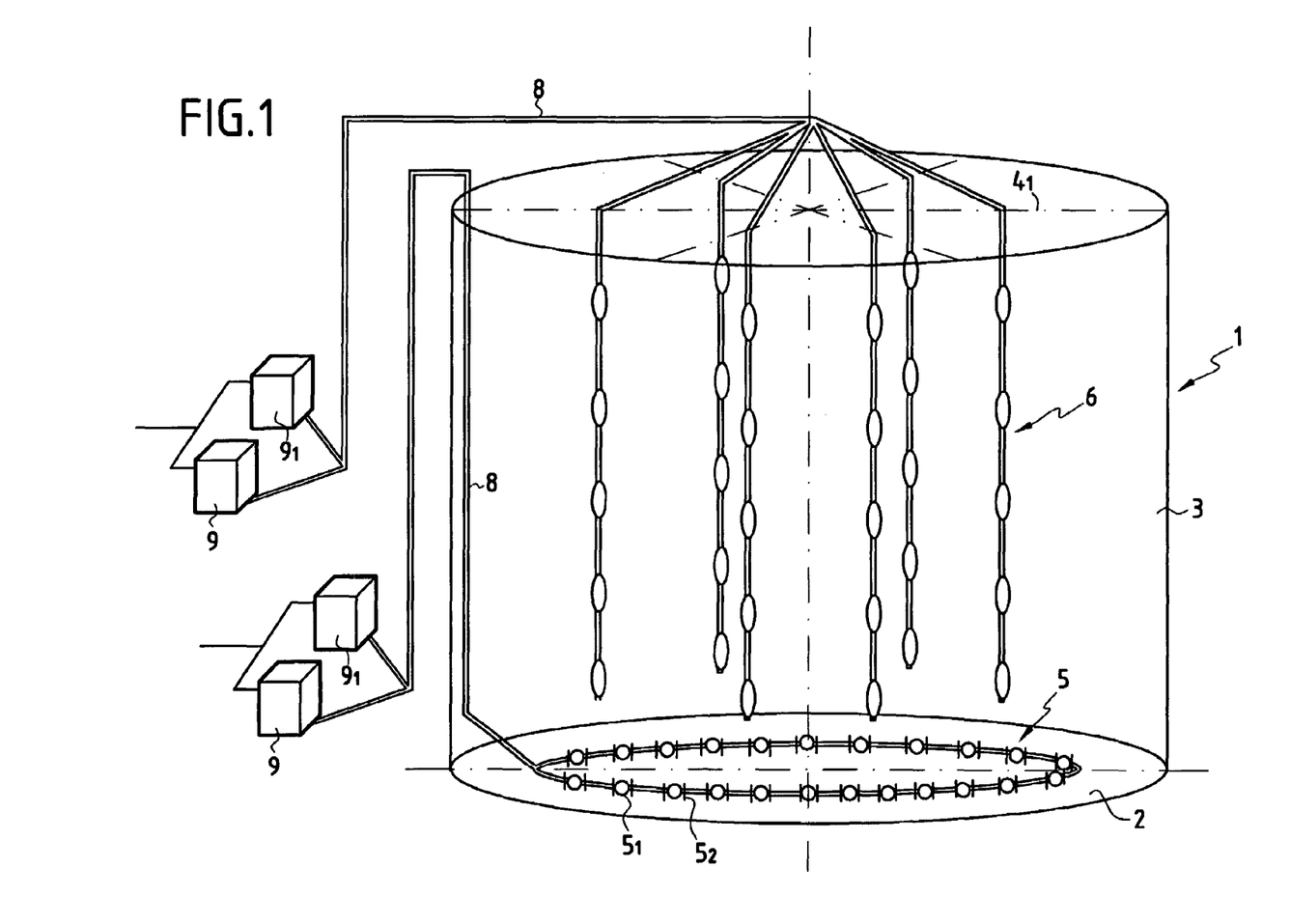
FIG. 1 is an exploded diagrammatic perspective view of a tank of the invention in which an array of anodes is fed with current by electric current generators.

FIG. 1 shows a circularly cylindrical metal tank 1 of large capacity comprising a bottom 1 and a circularly cylindrical side wall 3 serving to confine a cryogenic fluid that is to be stored.

Figure 2:
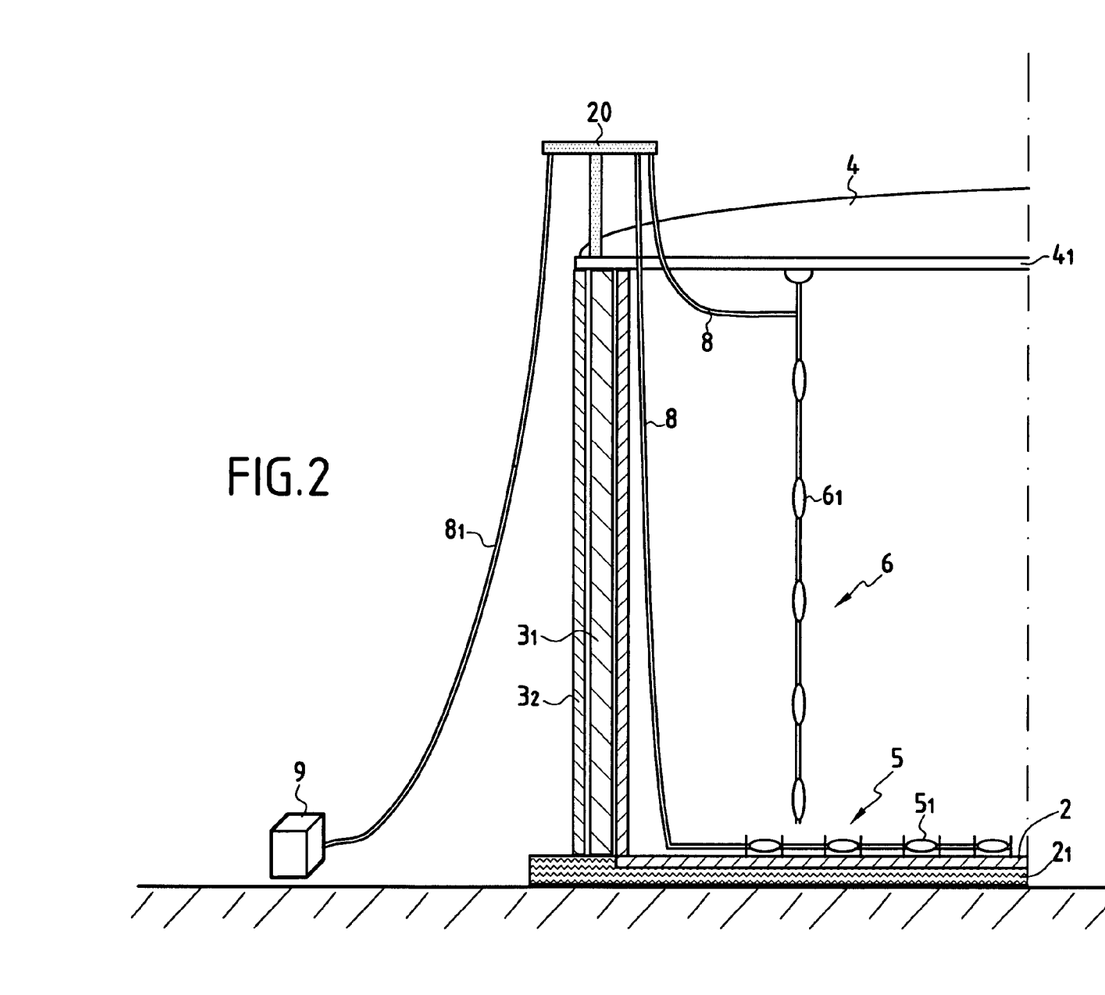
FIG. 2 is a side view in axial half-section of a tank of the invention, showing details of one particular embodiment of a junction between an electricity feed generator and strings of anodes.

FIG. 2 shows an insulation system for the cylindrical metal tank 1 giving it cryogenic properties, the insulation system being constituted by a layer of thermally insulating material $3_1$ itself surrounded by a rigid tubular structure constituted by a web of reinforced concrete $3_2$. On top, the tank 1 has a dome-shaped cover 4 supported by a metal frame $4_1$.

By way of example, the cylindrical metal tank may present a volume having an inside diameter of 75 m and a height of 50 m, giving a volume of 165,000 m$^3$. The total area of metal constituting the inside walls of the tank and needing to be protected by imposing a cathode current constitutes about 16,000 m$^2$.

It is advantageously made out of 9% nickel steel as described above, and its walls have a thickness of 19 mm for the bottom 2, and advantageously of 28.8 mm at the bottom ends of the vertical side walls, with this thickness of the vertical side walls tapering in substantially regular manner towards the top of the tank so as to reach a minimum thickness of 10 mm in the top portion of the vertical side wall 3 of said tank.

FIG. 2 shows a foundation raft $2_1$ having a thickness of 130 cm that confers great stiffness and that includes an insulating system.

The layer $3_1$ of thermal insulation surrounding the metal side wall 3 of the tank 1 is made out of pearlite, for example, and presents a thickness of 100 cm. The outer web $3_2$ of reinforced concrete has a thickness of 80 cm.

In FIGS. 1, 5, 9, and 10, there can be seen various arrangements for said first anodes that are disposed horizontally close to the bottom 2 of the tank, in circular dispositions.

Figure 5:
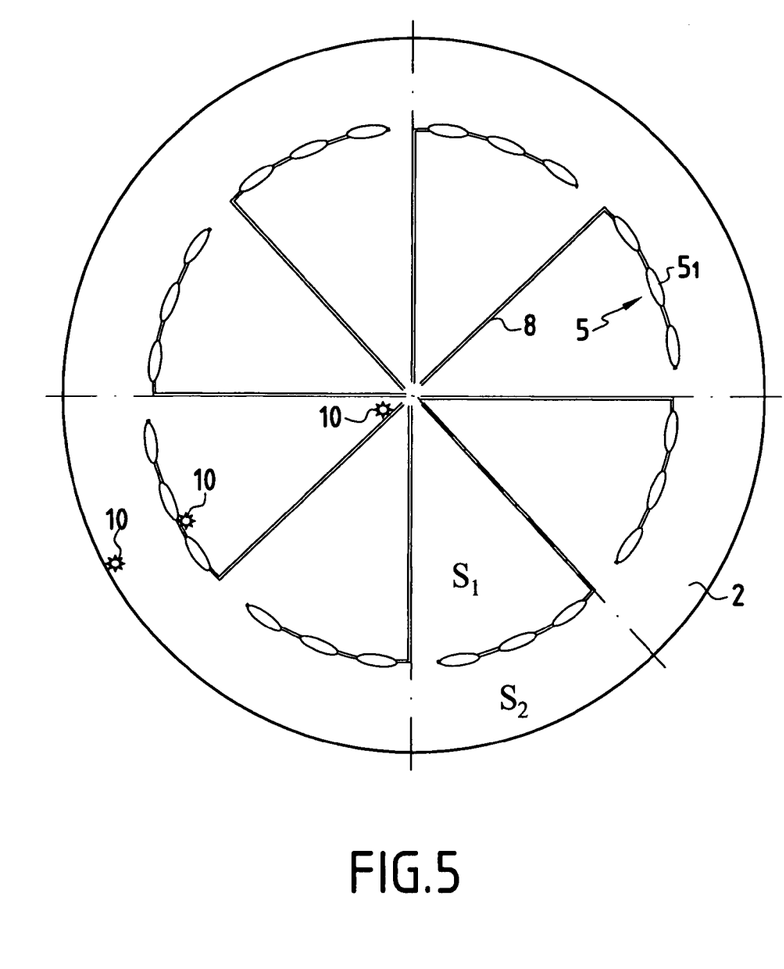
FIG. 5 is a plan view in section showing how different strings of anodes are distributed to rest on the bottom of the tank in a circular geometrical pattern.
Figure 6:
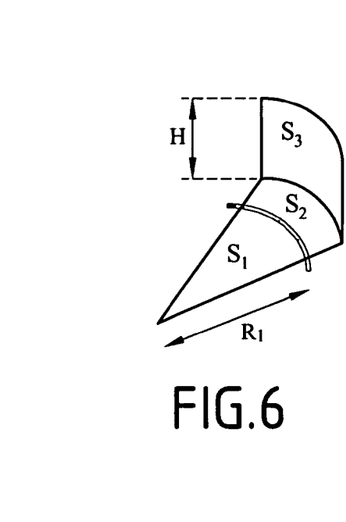
FIG. 6 is a perspective view of a zone of the surface of the bottom portion of the tank in register with an anode resting on the bottom.
Figure 9:
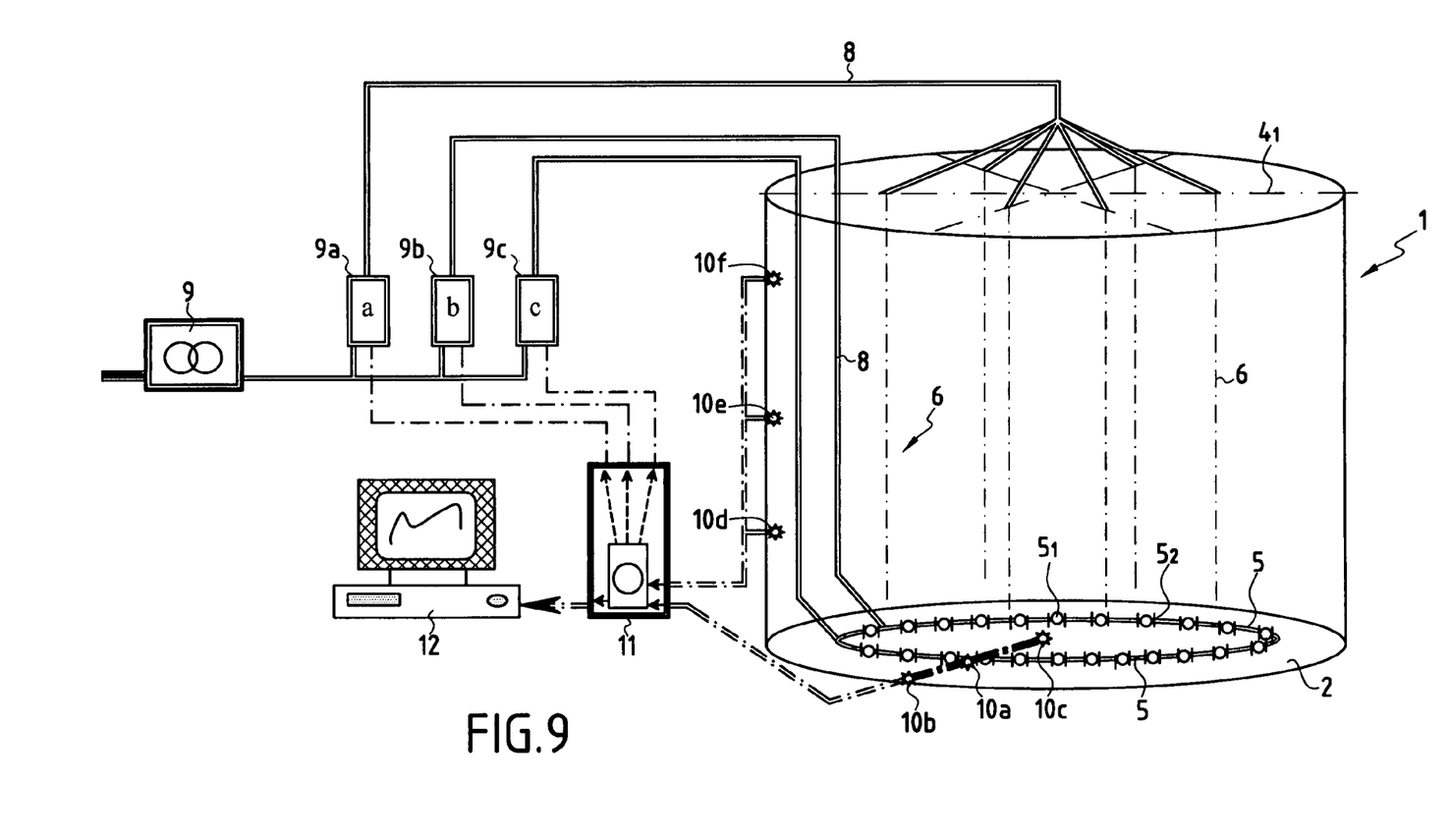
FIG. 9 shows a control system for governing the injection of polarization current.

In FIG. 1, said first anodes $5_1$ form a single "first" string 5 disposed in a circle $C_1$. In FIG. 9, said first anodes form two "first" strings 5, each occupying substantially a semicircle, with said two first strings together making up a circle $C_1$. In FIG. 5, said first anodes comprise a plurality of strings, namely eight "first" strings 5 extending horizontally, each of said first strings 5 comprising three anodes $5_1$. Said first strings form portions of a circle and they are disposed so as to be regularly spaced apart around a common circle. The embodiment of FIG. 5 with a plurality of said first strings is preferred since said first strings can be fed with respective different currents so as to match current levels to requirements in the zones concerned. For very large tanks, and in particular tanks of diameter greater than 75 m, said first strings 5 disposed around a first circle $C_1$ may be associated with elongate flexible anodes of smaller electric-current capacity disposed around a circle $C_2$ of smaller diameter so as to provide additional cathodic protection in the central zone on the surface of the bottom of the tank. Thus, in FIG. 10, two of said first flexible anodes are located in the central zone of the bottom of the tank in the form of a curved cable extending around a concentric circle $C_2$, with each of said elongate first anodes occupying substantially half the circumference thereof. This second series of first anodes disposed in the circle $C_2$ of smaller diameter thus provides additional cathodic protection in the central portion of the bottom 2 of the tank.

In FIGS. 1 and 2, there can also be seen second strings of anodes 6 suspended vertically from the structure $4_1$ of the dome 4 of the tank.

FIG. 1 shows the preferred disposition for the various second strings of anodes 6 extending vertically, i.e. in a circle in a horizontal section plane.

Figure 10:
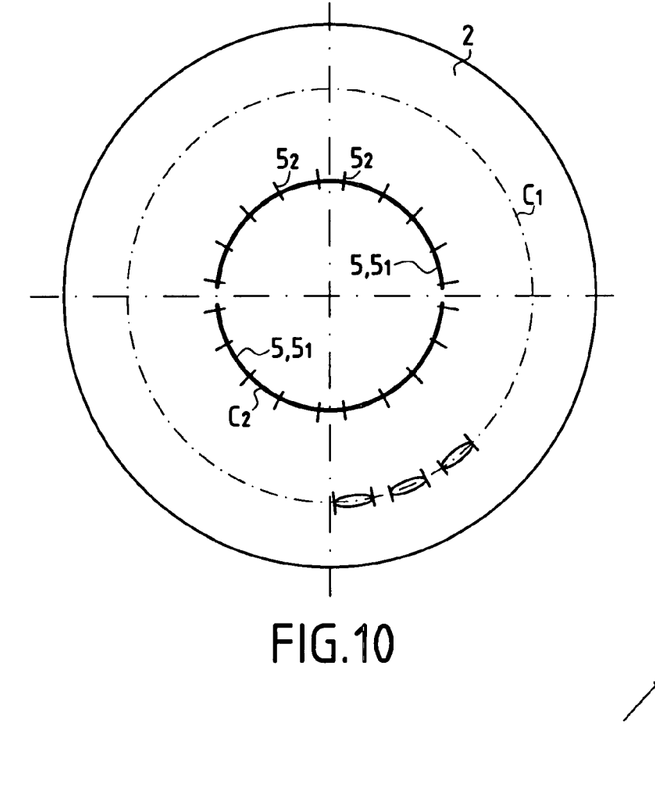
FIG. 10 is a plan view of a circular tank having strings of anodes as shown in FIG. 5 installed on the bottom thereof, and having towards the center a circular anode constituted by two continuous semicircles held at a distance above the bottom by insulating disks (not shown).

FIGS. 1 and 10 show six of said vertical second strings 6 each comprising, for reasons of convenience in the drawing, a plurality of anodes $6_1$ that are regularly spaced apart, with the bottom anode being situated at a height H above the floor.

Figure 3:
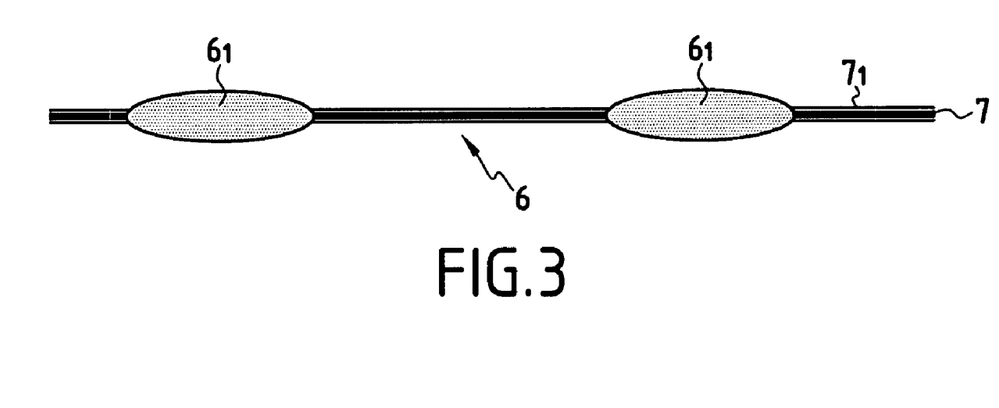
FIG. 3 shows a portion of a string of anodes suspended vertically.
Figure 4:
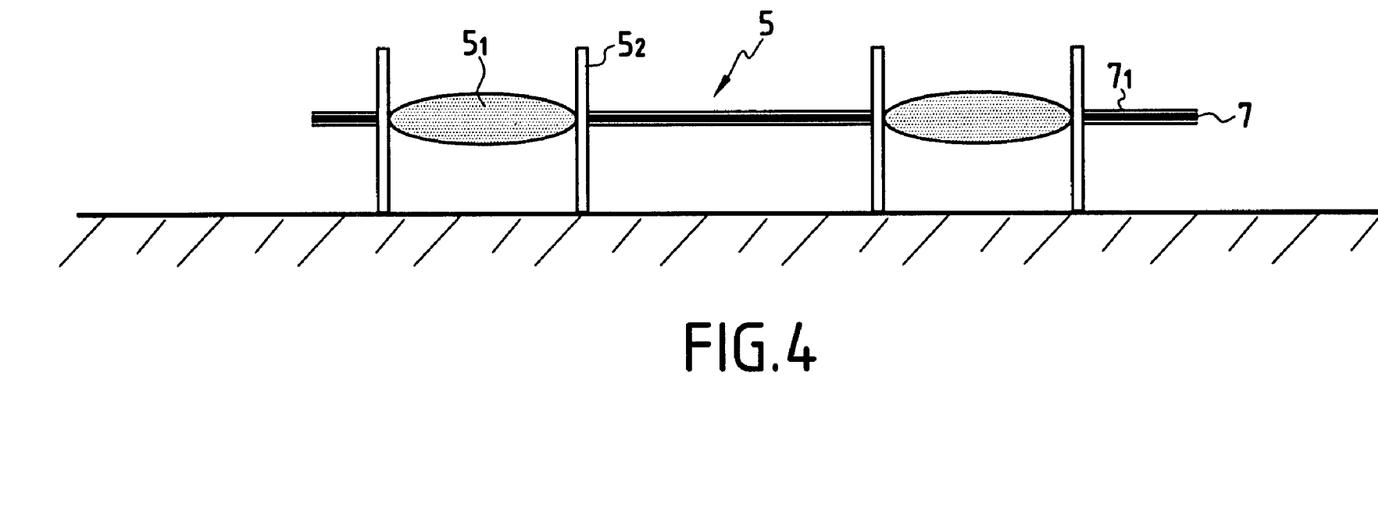
FIG. 4 shows a portion of a string of anodes lying on the bottom of the tank.

In FIGS. 3 and 4, the strings of anodes 5 and 6 are each constituted by a conductive cable 7, preferably made of copper, interconnecting said anodes $5_1$, $6_1$ or passing through them, the anodes preferably being crimped around said cable 7 which is held in place mechanically. Said anodes $5_1$, $6_1$ are made of a noble metal such as tungsten covered in various precious metals. Said anodes $5_1$, $6_1$ are preferably spaced apart in regular manner along said conductive cable 7. Between two anodes $5_1$, $6_1$ in a given string $5_6$, the cable 7 carries insulation $7_1$. However, the conductive cable 7 is naturally connected electrically to said anodes $5_1$, $6_1$, and only those portions of the cable which extend between two consecutive anodes $5_1$ and $6_1$ are insulated.

In each of said strings, the anodes $5_1$, $6_1$ used are of large capacity, i.e. it can accommodate 50 A, they are cylindrical or ovoid in shape, each being about 1 m long and about 22 mm in outside diameter, and spaced apart at 3 m to 5 m intervals along said strings in order to avoid interference and obtain maximum current density.

In said vertical second strings 6, only five anodes $6_1$ are shown for reasons of convenience in drawing, it being understood that for a tank having a height of 50 m, a larger number of said anodes is necessary.

The horizontal strings 5 are held in the immediate vicinity of the bottom 2 of the tank by means of support elements $5_2$, e.g. constituted by disks made of insulating material and presenting a diameter greater than the diameter of the anodes $5_1$, the disks being placed around the cable 7 at each end of each anode $5_1$. These insulating disks $5_2$ are disposed vertically and rest via their edges on the bottom 2 of the tank, having an outside diameter of 225 mm for anodes having a diameter of 25 mm, thereby guaranteeing that the anodes $5_1$ are at a substantially constant spacing of 100 mm from the bottom 2 of the tank, thus serving both to avoid electrical contact between the anodes $5_1$ and the bottom 2, and also to avoid an electrolytic short-circuit.

For a tank having a diameter of 75 m, it is advantageous for said first anode to be disposed as a plurality of strings around a circle of radius $R_1$=27 m.

Placing said first anodes $5_1$ that rest on the bottom of the tank in a circle constitutes the optimum disposition for avoiding interference between anodes which could have a harmful effect on the emitted current density. Placing the first anode $5_1$ in a circle having the above-described characteristics (anodes 1 m long, having a capacity of 50 A and spaced apart from one another by 3 m to 5 m) makes it possible to obtain an initial current density of 250 mA/m$^2$ to 275 MA/m$^2$ by injecting a current of 50 A into the anodes, thus obtaining a potential at the surface of the tank situated within a radius of several tens of meters from said anodes within several tens of minutes, or even within several minutes.

In FIG. 1, said vertical strings of anodes 6 are disposed around a circle having the same diameter as said horizontal strings of anodes 5, but that is solely for practical reasons of installing and removing the anodes. However, from a functional point of view, the distance at which said vertical second anodes $6_1$ are positioned relative to the surface of the side wall of the tank can be different from the distance of said first anode from said side wall. It is not necessarily advantageous for the vertical anodes $6_1$ to be too close to the surface of the side wall of the tank, since that would require a larger number of anodes to be used.

In the preferred version of the disposition for the horizontal strings of anodes 5 disposed in a circle $C_1$ as shown in FIGS. 1, 5, and 9, said circle $C_1$ has a radius $R_1$ of 25 m to 30 m, so as to define an inside surface area $S_1$ substantially equal to the sum of the surface area $S_2$ constituted by the remaining fraction of the surface on the bottom of the tank outside the circle constituted by said horizontal strings 5, plus the surface area $S_3$ corresponding to the bottom portion of the vertical side wall 3 of height H corresponding to the height of the bottom ends of said vertical strings of anodes ($S_1=S_2+S_3$), so for a radius $R_1$ in the range 25 m to 30 m, H lies in the range 1 m to 4 m.

While the tank is being filled, when sea water reaches the end anodes $6_1$ at the bottom ends of said vertical second strings of anodes 6, but before it makes contact therewith, it is only the first anode $5_1$ in said horizontal first string of anodes 5 situated on the bottom that provide cathodic protection for the bottom portion of the tank comprising the bottom and the portion of the vertical wall that has been wetted by sea water. Thus, until said anodes $6_1$ of said vertical strings of anode 6 come into operation, said horizontal strings of anodes 5 resting on the bottom occupy substantially the center of gravity of the surface of the tank that is to be protected comprising the surface area of the bottom of the tank $S_1+S_2$ plus the surface area of the bottom portion of the side walls $S_3$ situated beneath the bottom suspended anodes $6_1$, and the extremely high currents which are injected in order to achieve the required level of polarization as quickly as possible are distributed in uniform and optimum manner from the center of the tank to the periphery of the bottom and up the side wall to a height H.

Figure 7:
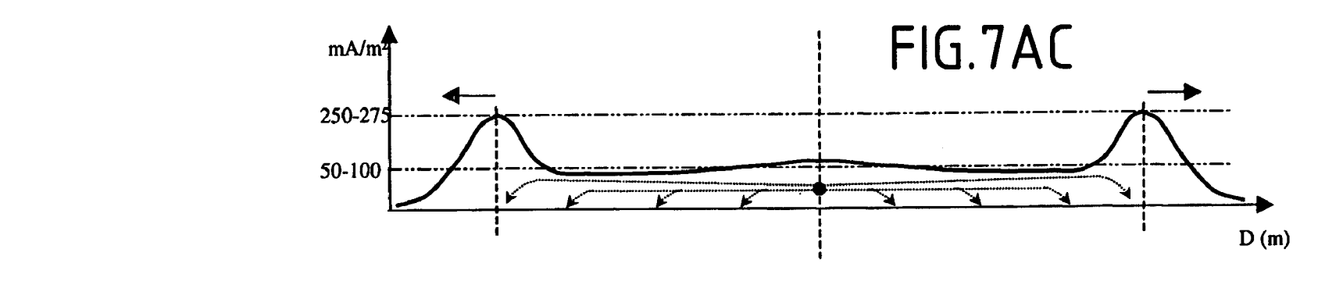
FIGS. 7A to 7D are graphs in which the anode is represented by a •, with polarization current density (in mA/m$^2$) being plotted up the ordinate and with distance from the anode being plotted along the abscissa.
Figure 7A:
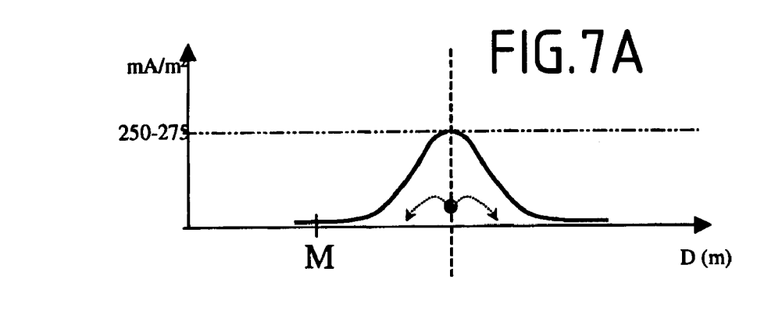
Figure 7B:
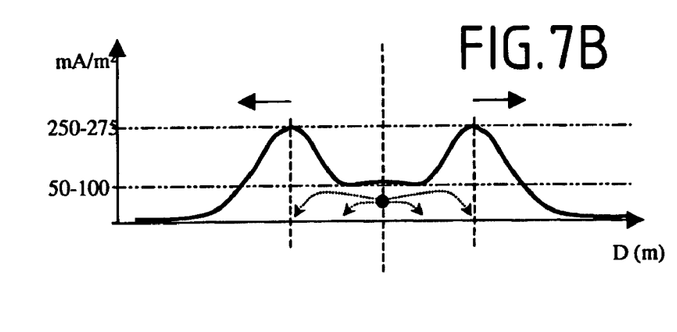
Figure 7D:
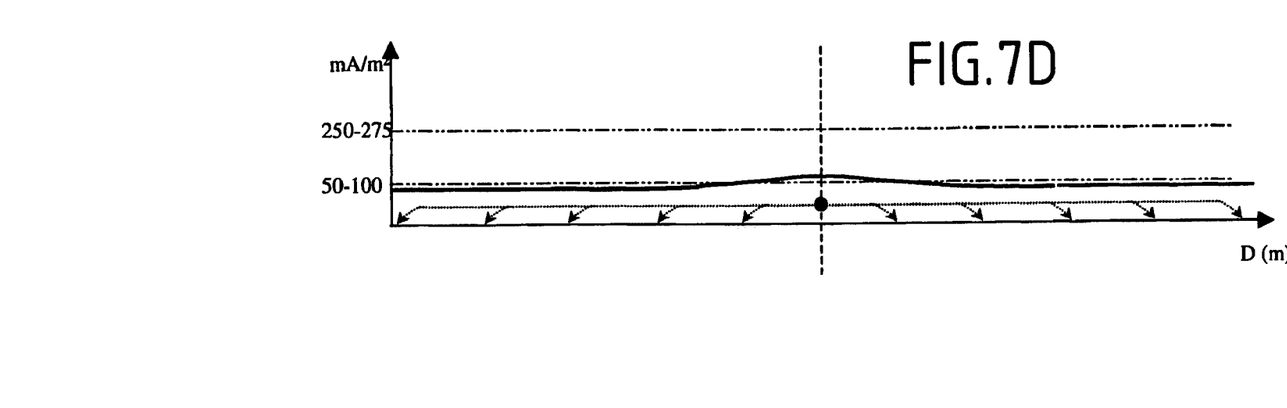
Figure 8A:
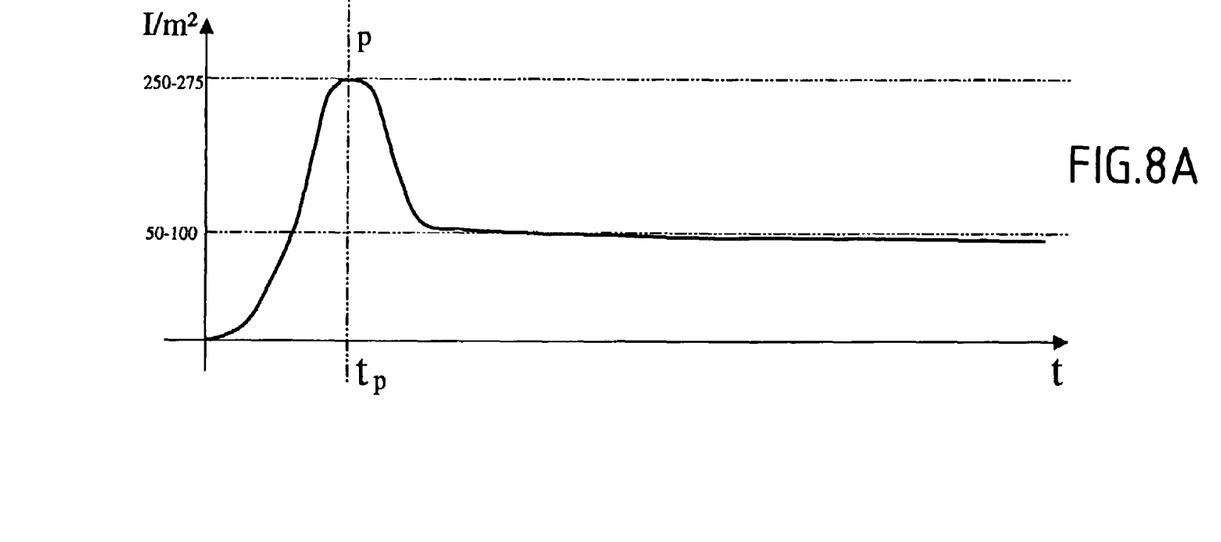
FIGS. 8A and 8B are graphs showing how electrochemical potential E (FIG. 8A) and current density (I/m$^2$) vary at an arbitrary location M on the metal side wall or bottom to be protected, the point M being situated at a certain distance from the anode, as shown in FIG. 8A.
Figure 8B:
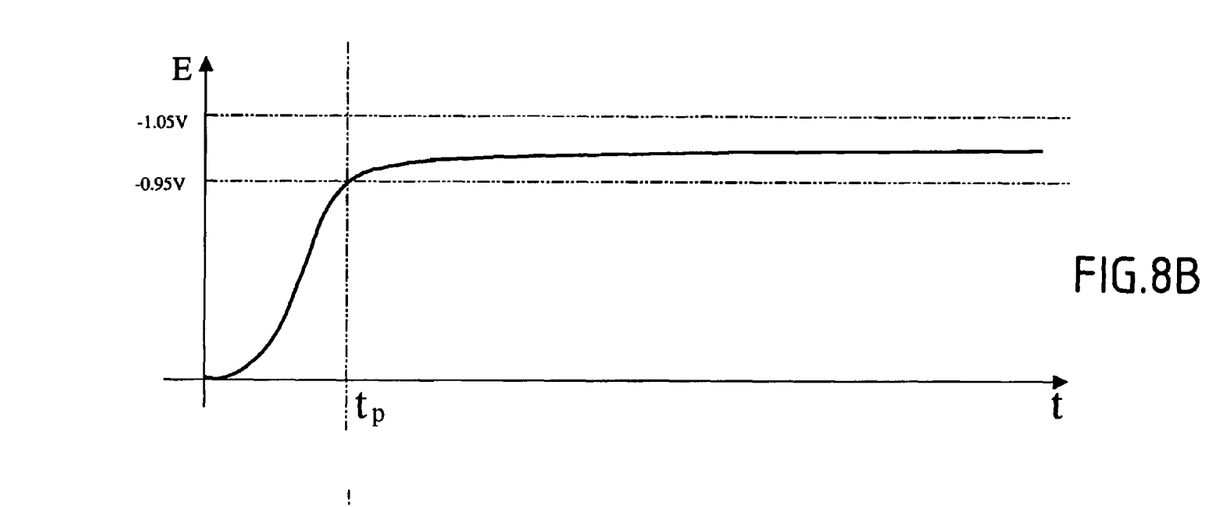

The polarization process is explained with reference to FIGS. 7A to 7D and 8A to 8B which show how current density (mA/m$^2$) varies as a function of position relative to an anode in FIGS. 7A to 7D. FIG. 7A shows current density at the beginning of current injection into the anode, and FIGS. 7B, 7C, and 7D are diagrams at successively later instants. FIGS. 8A and 8B plot respectively electrochemical potential E and current density (I/m$^2$) as measured at a given point on the surface of the tank to be treated, as a function of time.

In FIGS. 8A and 8B, it can be seen that electrochemical potential E and current density rise simultaneously up to a time $t_p$ at which the electrochemical potential E reaches an immunity value of −0.95 V in the present case, which is characteristic of polarizing the 9% nickel steel that is used, and at which substantially simultaneously a current density peak is reached of 250 MA/m² to 275 mA/m². It can be seen in FIGS. 7A to 7D that as soon as current injection begins at an anode, current density is very large in the zone close to the anode and decreases on going away therefrom. The injection current is voluntarily limited to a maximum value lying in the range 250 mA/m² to 275 mA/m² since this level is sufficient for reaching the protection potential (−950 mV) of such a steel very quickly.

An electrochemical process occurs within the sea water charged with mineral salts and a deposit of calcium and magnesium-based scale is observed. This scale is thus deposited between t=0 and t=$t_p$ in FIGS. 8A and 8B in the zone close to the anode, after which current density decreases and stabilizes in the range 50 mA/m² to 100 mA/m² while the voltage E no longer varies significantly and remains at about −1 V. The scale deposit is due to the increase in pH on the polarized surface and it creates a natural insulating barrier having the effect of causing the current density over the area concerned to decrease down to a value lying in the range about 50 mA/m² to about 100 mA/m², which is sufficient for keeping the potential E at a value more negative than −0.95 V for a 9% nickel steel, thus preventing any corrosion process.

It can thus be seen that by moving the anode as close as possible to the bottom of the tank and by increasing the injected current level, the process with which the protective layer is formed is significantly accelerated.

In practice, by placing the anodes $5_1$ at a few centimeters from the bottom, they become immersed in a few minutes if the sea water filling rate is greater than 1000 cubic meters per hour (m³/h), such that once they have become immersed they come into action almost instantaneously and within a few minutes confer the beginning of effective protection. Furthermore, when the level of injected current is sufficiently high in the high-capacity anodes (capacity of 50 A), and when the anodes are present in sufficient numbers and suitably distributed as described above, it is then also possible to obtain cathodic protection quickly (in a few minutes) at a distance that can be as great as about 10 meters. Thus, within a few tens of minutes, the entire surface on the bottom of the tank is completely protected in such a manner as to avoid any initiation of corrosion.

In a preferred embodiment, the test of verifying the tank for leaks and mechanical strength by filling it with water begins by filling the tank with fresh water at a rate of 1000 m³/h until the bottom anodes $5_1$ are completely immersed, which generally represents a depth of 5 cm to 10 cm and thus a volume of water that is reasonable. Thereafter, current is injected into said anodes and filling is continued using sea water at a very high rate.

The "fresh" water can be taken either from the local water supply mains or from river water or from industrial water, providing it is not too aggressive.

Once the sea water mixes with the fresh water and current is injected into the anodes, the metal surface of the bottom of the tank polarizes in a cathodic protection configuration in a few minutes because of the way the anodes are distributed and because of the very large currents that are injected simultaneously via all of the anodes resting on the bottom of the tank.

Said strings of anodes 5 and 6 are connected to one or more current generators 9, and a device $9_1$ monitors and controls current via a cable 8 that extends out from the tank 1, preferably via the top thereof. A plurality of strings 5, 6 may be connected together in arrays and associated with a single current generator 9. Nevertheless, said horizontal first strings of anodes 5 and said vertical second strings of anodes 6 are preferably connected to different generators 9 or to a single generator 9 associated with different controllers 9a–9c, and preferably each of said anode strings 6 is connected to a different generator 9 or controller 9a–9c, thus enabling current injection to be controlled differently in each of said strings 5, 6 (as described below) so as to optimize cathodic protection as a function of the zones of the bottom wall 2 and the side wall 3 that are being protected. This can be made necessary by defects occurring in particular ones of said zones, and is certainly necessary if the tank is prismatic on a polygonal base, since such a tank has corners that are relatively fragile and that require a higher level of cathodic protection than the remainder of the tank.

In FIG. 2, the various vertical strings of anodes 6 suspended from the superstructure $4_1$ of the dome 4 of the tank, and the various horizontal strings 5 resting on the bottom of the tank, are electrically connected by means of cables 8 to a single current generator 9, with the various cables 8 being suspended from a bracket 20. Such a bracket 20 may also be installed on the preferred and advantageous embodiment shown in FIG. 9.

In FIG. 9, the electrochemical potential E of the wall of the tank 1 is monitored by placing three sensors 10a, 10b, and 10c on the bottom 2 of the tank and by placing three additional sensors 10d, 10e, and 10f along a generator line of the vertical walls. These sensors 10a–10f, e.g. of the Ag/AgCl reference cell type, are connected to a monitoring and control unit 11, and the electrochemical potential values are recorded throughout the duration of the test on a PC type computer 12. The low-voltage polarization current, e.g. 24 V DC is delivered by a transformer and rectifier unit 9 connected to the mains power supply and connected to three electronic controllers 9a, 9b, 9c using thyristors under the control of the central monitoring and control unit 11. The controller 9a is connected to all of said vertical second strings 6, and the controllers 9b and 9c are connected respectively to two different ones of said first strings of anodes 5 or to two of said continuous first anodes 51 disposed in a semicircle and resting on the bottom of the tank, but insulated therefrom, as explained with reference to FIG. 10.

The sensors 10a to 10c disposed on the bottom are advantageously disposed as follows:

the sensor 10a is situated close to the circular anodes so as to monitor the polarization wave shown in FIG. 7A and its displacement towards 7B;

the sensor 10b is situated close to the corner with the cylindrical side wall to monitor how polarization current varies as the water becomes deeper; and a last sensor 10c is advantageously located towards the center of the tank so as to monitor the polarization state over the entire bottom of the tank, as shown in FIGS. 7C and 7D.

The sensors 10d, 10e, and 10f are advantageously installed along a generator line of the vertical wall 3 to monitor polarization as the depth of water rises up to the top of said tank.

To clarify the figure, the cables leading to the sensors are shown as being directly connected to the monitoring and control system 11, but in reality, they follow a path similar to that of the power cables 8, i.e. they go up inside the tank and leave it at dome level via a bracket 20, before coming back down to said monitoring and control system 11.

The electrochemical potential needs to be maintained in a range beyond a minimum (absolute) value, for example more negative than −0.95 V, while not going beyond −1.2 V, for example. Thus, as soon as said electrochemical potential approaches said minimum (absolute) value of −0.95 V, the monitoring and control system 11 significantly increases the current that is injected by means of the corresponding controllers 9a, 9b, and 9c. Similarly, when the electrochemical potential approaches −1.2 V, said monitoring and control system acts by significantly reducing the corresponding amount of current that is injected.

As shown in FIG. 10, it remains within the spirit of the invention for the anodes to be distributed on the bottom as a plurality of circles, or in any other kind of geometrical distribution, regardless of whether the anodes are discontinuous and cylindrical in shape, oval in shape, or polygonal, and regardless of whether they are continuous in the form of a cable ("wire" anodes) presenting high performance in terms of current injection capacity, it being understood that in all such dispositions, said anodes are held apart from the surface by insulating devices to prevent direct short-circuits and electrochemical short-circuits.

Figure 11:
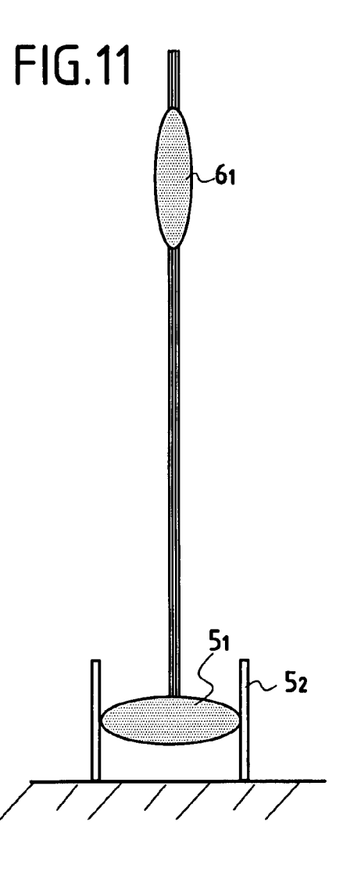
FIGS. 11 and 12 show vertical strings of anodes fitted at their bottom ends with an oblong anode of cylindrical shape (FIG. 11) or in the form of a disk (FIG. 12) resting on the bottom, and isolated from said bottom by disks (FIG. 11) or studs (FIG. 12), thus acting as one of said first anodes.
Figure 12:
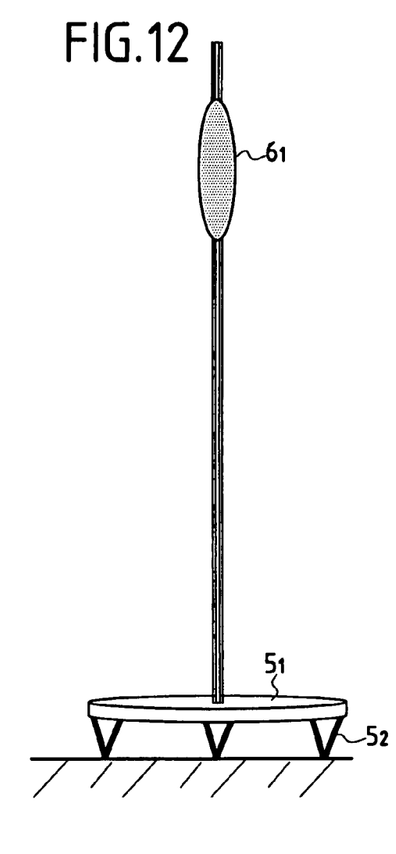

FIGS. 11 and 12 show variant embodiments of said first anodes $5_1$, in which variants they are constituted by first anodes located to terminate vertical second strings 6. Said first anodes $5_1$ rest on the bottom 2 of the tank via support means $5_2$, said nearest second anode $6_1$ situated immediately above it being positioned at a height H lying in the range 1 m to 4 m.

In FIGS. 11 and 12, said first anodes $5_1$ are disposed horizontally, i.e. their major dimension is in a horizontal direction, whereas for the second anodes $6_1$ that are intended to protect the vertical side walls, the anodes are disposed vertically, i.e. their major dimension extends in a vertical direction. In FIG. 11, said first anodes are of oblong shape and are held by support means $5_2$ constituted by vertically-disposed insulating disks fixed to respective ends of the anode. In FIG. 12, said first anodes $5_1$ are horizontal disks supported by support means constituted by studs or legs $5_2$ disposed under said disks constituting said first anodes $5_1$.

After the tank has been built and before it is filled with sea water, said first anodes are installed on the bottom of said tank and held in place, either by being fixed mechanically or by temporary adhesive, or indeed by stabilizing them with weights, so as to ensure that the assembly does not deform or move while the tank is being-filled, with said filling being performed at a considerable rate (1000 m³/to 1500 m³/h) thus giving rise to large amounts of swirling.

Said vertical second strings are suspended from the framework $4_1$ of the dome, and the various cables for feeding current and the various measurement cables coming from the electrochemical potential measuring cells leave the tank at the level of the dome 4 prior to reaching the power units and the monitoring and control units.

The walls of the tank are leak-tested both concerning the vertical side wall, and concerning the connection between the bottom wall and the side wall, by observing said walls from the outside, in particular from the zone set aside for insulation and that is accessible because of its size.

At the end of testing, the tank is emptied, and then the measurement cells are withdrawn, as are the first and second anodes.

The tank is then rinsed using a jet of fresh water under pressure, over the entire surface of its wall in order to eliminate all traces of salt, after which the water is allowed to evaporate.

The invention claimed is:

1. A method of testing a cryogenic metal tank prior to being put into service, in which said tank is filled with water and appropriate measurements are performed where necessary, wherein the following steps are performed: filling said metal cryogenic tank with sea water; and providing temporary cathodic protection for the metal bottom and side walls of said tank that are constituted essentially by bare steel, by disposing first anodes within said tank and by injecting an electric current into the first anodes once they become immersed.

2. A method according to claim 1, wherein said first anodes comprise a first anode array disposed in the immediate vicinity of the bottom of the tank using a means for supporting said first anodes, said means for supporting said first anodes and said first anode array preferably being removable.

3. A method according to claim 2, wherein said first anode array is disposed close to the bottom of the tank and is situated above the bottom of the tank at a distance of less than 50 cm, and preferably in the range 2.5 cm to 20 cm, and more preferably in the range 5 cm to 10 cm.

4. A method according to claim 2, wherein said first anodes are connected to one another by one or more cables constituting one or more first strings, said first strings being disposed substantially horizontally above and in the vicinity of said bottom of the tank.

5. A method according to claim 4, wherein said means for supporting said first anodes is constituted by disks resting vertically on the bottom of the tank, the diameter of said disks being greater than the dimension of said first anodes in the vertical direction, the centers of said disks, where appropriate, having portions of insulated cable passing therethrough interconnecting two successive ones of said first anodes of said first string.

6. A method according to claim 2, wherein said means for supporting said first anodes is constituted by elements of electrically-insulating material resting on the bottom of the tank and disposed at opposite ends of each said first anodes where appropriate, along a said first string.

7. A method according to claim 2, wherein said metal of the tank is 9% nickel steel and the electrochemical potential of said steel is −950 mV, and said first anodes rest close to the bottom of the tank in such a manner as to enable a current density of 200 mA/m² to 400 mA/m² to be achieved.

8. A method according to claim 1, wherein said first anodes are disposed along a circle that is concentric about the center of the bottom surface of the tank, and the diameter of said circle is preferably 40% to 75% the diameter of the bottom surface of the tank.

9. A method according to claim 1, wherein there are placed inside said tank said first anodes disposed horizontally close to the bottom of the tank, and second anodes that are suspended vertically inside the tank from a top of the tank, preferably in removable manner, said second anodes also preferably being connected together in the form of second strings that are suspended vertically, said second strings also preferably being regularly spaced apart from one another in such a manner as to be inscribed, also preferably, in a circular cylinder having the same axis as said tank.

10. A method according to claim 9, wherein the last ones of said second anodes disposed at the bottom ends of said vertically suspended second strings are situated at a height H from the bottom in such a manner that the area of the circular surface defined by said first anodes is substantially equal to the sum of the area of the remaining surface of said bottom of the tank plus the area of the bottom portion of height H of the vertical side wall of said tank.

11. A method according to claim 9, wherein devices are placed against the walls of said tank in order to measure the electrochemical potential of said walls and control a plurality of electricity generators feeding said first and second anodes in such a manner as to be able to regulate the quantity of electric current that is injected into respective ones of said first and second anodes as a function of said measurements made in association with said respective anodes, depending on their locations.

12. A method according to claim 1, wherein said tank is initially filled with fresh water until said first anodes lying in the immediate vicinity of the bottom of the tank are substantially completely immersed, after which electric current is injected into said first anodes and the filling of said tank is continued using sea water.

13. A method according to claim 1, wherein said tank is a cryogenic tank having bare metal walls and including a temporary cathodic protection system comprising first and second anodes, preferably disposed removably within said tank by support means, said tank also including devices enabling the electrochemical potential of said walls to be measured so as to control a plurality of electricity generators in such a manner as to be able to regulate the quantity of electric current that is injected into respective ones of said first and second anodes as a function of said measurements made in association with said respective anodes, depending on their locations.

14. A method according to claim 13, wherein the diameter of the bottom of the tank is not less than 50 m.

* * * * *

UNITED STATES PATENT AND TRADEMARK OFFICE
CERTIFICATE OF CORRECTION

PATENT NO. : 7,182,852 B2  Page 1 of 1
APPLICATION NO. : 10/477361
DATED : February 27, 2007
INVENTOR(S) : Alphonse Boreave It is certified that error appears in the above-identified patent and that said Letters Patent is hereby corrected as shown below:

Column 13, line 64, claim 1 should read as follows, in its entirety:

-- 1. A method of testing a cryogenic metal tank comprising nickel steel prior to being put into service, in which said tank is filled with water and appropriate measurements are performed where necessary, wherein the following steps are performed:

filling said metal cryogenic tank with sea water; and providing temporary cathodic protection for the metal bottom and side walls of said tank that are constituted essentially by bare steel, by disposing first anodes within said tank and by injecting an electric current into the first anodes once they become immersed, said anodes comprising an array of anodes disposed in the immediate vicinity of the bottom of the tank and capable of delivering a current density that enables the electrochemical potential for protecting said steel almost instantaneously after being immersed in water. --

Signed and Sealed this

Eleventh Day of August, 2009

David J. Kappos
*Director of the United States Patent and Trademark Office*